United States Patent [19]

Lewis

[11] Patent Number: 4,604,708
[45] Date of Patent: Aug. 5, 1986

[54] ELECTRONIC SECURITY SYSTEM FOR EXTERNALLY POWERED DEVICES

[76] Inventor: Gainer R. Lewis, 7018 Pacific View Dr., Hollywood, Calif. 90068

[21] Appl. No.: 669,727

[22] Filed: Nov. 8, 1984

Related U.S. Application Data

[63] Continuation of Ser. No. 328,080, Dec. 7, 1981, abandoned.

[51] Int. Cl.⁴ .................. G08B 13/06; G06F 1/00; B60R 25/00
[52] U.S. Cl. .................. 364/900; 340/825.31
[58] Field of Search .......... 340/825.3, 825.31, 825.32, 340/825.34; 364/200, 900

[56] References Cited

U.S. PATENT DOCUMENTS

| | | | |
|---|---|---|---|
| 4,103,289 | 7/1978 | Kolber | 340/825.32 |
| 4,179,733 | 12/1979 | Launzel et al. | 364/200 |
| 4,288,659 | 9/1981 | Atalla | 340/825.31 |
| 4,310,720 | 1/1982 | Check, Jr. | 364/900 |
| 4,333,074 | 6/1982 | Sutherland et al. | 340/825.3 |
| 4,333,090 | 6/1982 | Hirsch | 340/825.3 |
| 4,366,466 | 12/1982 | Lutz | 340/825.31 |
| 4,447,890 | 5/1984 | Duwiel et al. | 364/900 |

OTHER PUBLICATIONS

Byte, *Word Protection for Your Computer*, by R. Jordan Kreindler, Mar. 1979, pp. 194–195.

*Primary Examiner*—Gareth D. Shaw
*Assistant Examiner*—Daniel K. Dorsey
*Attorney, Agent, or Firm*—Blakely Sokoloff Taylor & Zafman

[57] ABSTRACT

An electronic security system for a device requiring an external power source is disclosed. The security system includes a microcomputer which executes a power-on routine stored in memory whenever the microcomputer is initially coupled to a power source. The user must enter a primary security code which is compared to a predetermined code, and if the codes match, the microcomputer signals a relay to provide power to the device, thereby enabling it. Once enabled, the user need not reenter the security code as long as the external source of power to the device remains uninterrupted. A secondary security code may be entered if the primary code has been forgotten or misplaced. Upon entry of the secondary code, the microcomputer displays an encrypted version of the primary security code. If an incorrect code is entered by the user, the microprocessor executes an alarm routine which may include visual and audible warnings.

16 Claims, 2 Drawing Figures

ELECTRONIC SECURITY SYSTEM FOR EXTERNALLY POWERED DEVICES

This application is a continuation, of application Ser. No. 328,080, filed Dec. 7, 1981, now abandoned.

BACKGROUND OF THE INVENTION

1. Field of the Invention

The invention relates to electronic security systems, particulary those systems which require a predetermined code to be entered by a user in order to gain access to or enable a device.

2. Prior Art

The escalating crime rate in recent years has prompted a need for increased security measures to protect personal property. A frequent target of thieves is electronic devices, such as for example, televisions, radios, microwave ovens, calculators and stereophonic systems. Due to the portability of many of these modern electronic devices, a thief can, with relative ease, resell or "fence" the stolen device after altering or destroying the manufacturer's serial number, thus rendering tracing by law enforcement agencies difficult if not impossible.

Attempts to secure electronic devices were initially directed toward mechanical means which physically lock or disable the television, calculator or the like. However, mechanical means have inherent disadvantages which serverely limit the practicality of this type of solution. For example, the mechanical means are typically expensive, and additionally eliminate or restrict portability which is a major advantage of modern electronic devices.

Electronic solutions to the problem of theft have included the use of a security code system which requires the user to input a predetermined code in order to gain access to or enable the protected device. Thus, each time a user desires to operate a device incorporating a security code system, he must input the predetermined code.

An example of an electronic system for a solid state device is disclosed in U.S. Pat. No. 4,139,864 by Schulman. The Schulman security circuit is in part formed on one of the same micro-electronic "chips" as that of the electronic device itself, thereby preventing a thief from physically bypassing the circuit. In order to enable the device, a user must key in a pass code, which when compared and matched with a preset internal code allows access to the device.

An example of an electronic security system for the control of communication signals is disclosed by Launzel, U.S. Pat. No. 4,179,733. The Launzel circuit incorporates a microprocessor which executes a predetermined sequence of operations upon the activation of the device's power switch. Once a predetermined security code has been entered by the user, the circuit compares the inputted code with a code stored in memory and if a match occurs the communication system is enabled.

Systems such as Schulman and Launzel require that the user enter the pass code each time he desires to make use of the device. For devices such as televisions, stereo receivers, microwave ovens and other related items which are frequently used sporadically during the course of a day, the requirement of entering a code each time operation is desired is extremely inconvenient. Furthermore, individuals who are not residents of the consumer's household, such as baby sitters and house guests, would have to be provided with the particular pass code in order to operate a device so protected, thereby potentially compromising security. Moreover, in a home or business equipped with several pass code protected devices known in the prior art, the requirement of remembering which pass code enables which device would likely prove intolerable. Thus, it is likely that consumers would not purchase a device which incorporates a pass code security system as was typical in the art prior to the present invention, since any security benefit would be perceived as outweighed by the inconvenience factor in using the device.

In addition, with systems such as Schulman and Launzel, it is possible for a thief to alter or destroy the serial number of a stolen device and render tracing difficult if not impossible in many cases. Furthermore, an unauthorized user could likely obtain the pass code by contacting the manufacturer of the device and representing that he is the true owner, inasmuch as the manufacturer had no straightforward method to check the credibility of the inquiring individual. Accordingly, there exists a need for a security system for electronic devices which is both secure and convenient for the user.

As will be disclosed below, the present invention overcomes the disadvantages associated with pass code systems such as Schulman, Launzel, and other prior art systems, by providing a unique security circuit which requires that a security code be entered only once in order to enable a device as long as a continuous source of power is supplied thereto.

SUMMARY OF THE INVENTION

The present invention is most advantageously used in conjunction with televisions, radio receivers and other electrical devices which require an external power source. A microcomputer executes a power-on routine stored in memory each time the device is coupled to the power source. The user must enter a primary security code which is compared with a stored (or algorithmically generated) code, and if the codes match the device is enabled. Once enabled, the device may be operated without reentering the security code as if the security system were not present, until the power source is removed by, for example, a thief unplugging the device from an A.C. line.

If an incorrect security code is entered, the microcomputer executes an alarm routine which may display "HOT" or the like on a digital readout, and may energize an audible alarm signal.

If the primary security code is misplaced by a user, the manufacturer or its authorized agent after satisfactorily identifying the user provides a secondary code, which upon entry into the security system's microcomputer causes to be displayed an encrypted version of the primary security code. The manufacturer using an decryption algorithm then provides the primary security code to the user. Additionally, the primary code may be cross-referenced to the device's serial number to facilitate tracing by law enforcement agencies.

DETAILED DESCRIPTION OF THE INVENTION

A security system for electronic devices such as televisions, radio receivers and the like which require an external source of power is disclosed. In the following description for purposes of explanation, specific numbers, etc. are set forth in order to provide a thorough understanding of the present invention. However, it will be apparent to one skilled in the art that the present invention may be practiced without these specific details. In other instances, well known circuits and devices are shown in block diagram form in order not to obscure the present invention in unnecessary detail.

Figure 1:
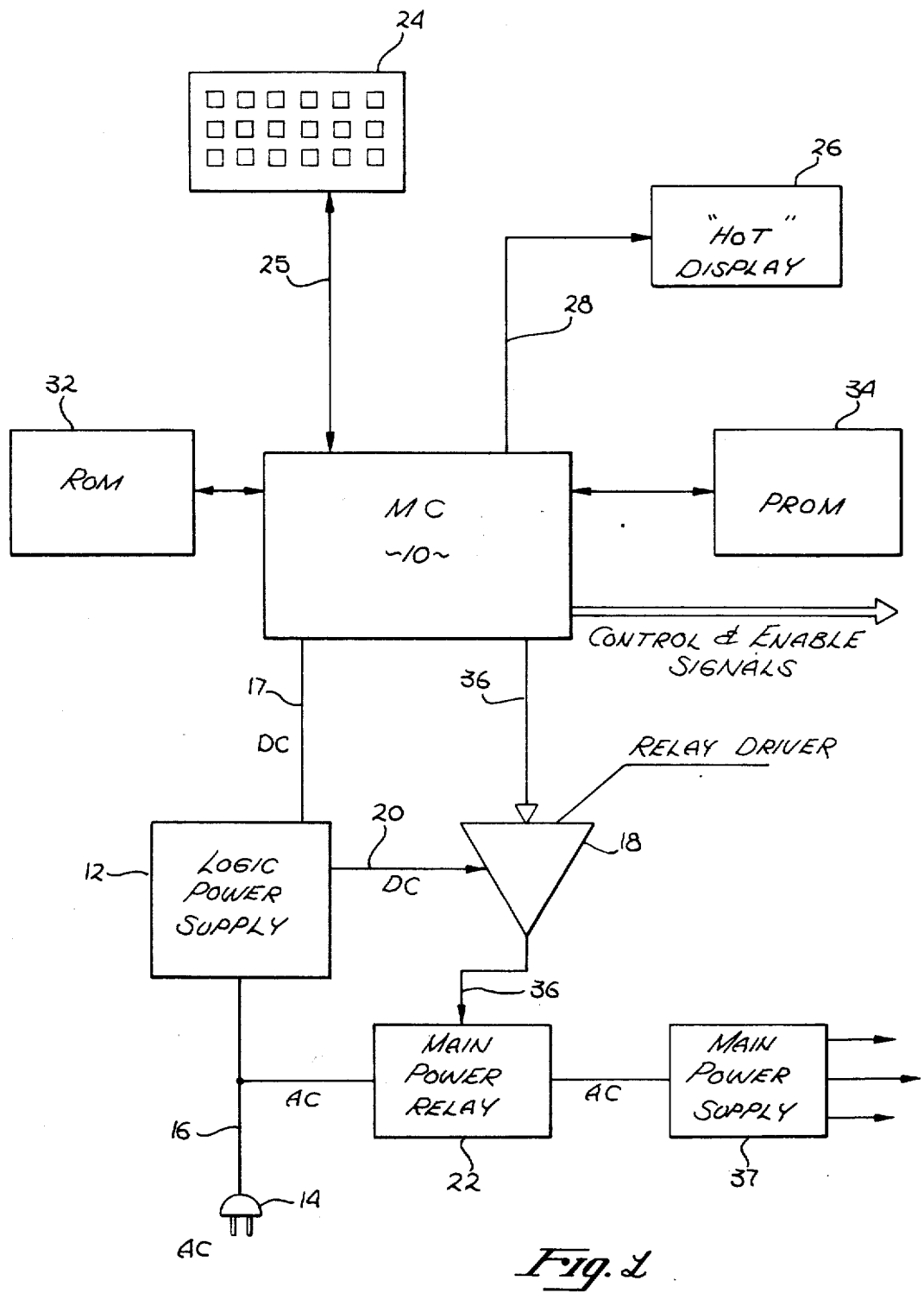
FIG. 1 is a block diagram illustrating the security system of the present invention.

Referring now to FIG. 1, the present invention includes as a part thereof a microcomputer indicated by Numeral 10. The microcomputer can be any one of a variety of types currently commercially available. It will be appreciated from the discussion which follows that an existing on-board microcomputer of the type typically used in frequency-synthesized tuning systems in television and radio may be utilized, with little modification to those devices which incorporate such tuning systems.

The microcomputer 10 receives D.C. power from a D.C. logic power supply 12 which, in the presently preferred embodiment, is coupled to an A.C. external power source 14 by line 16. The logic power supply 12 is also coupled to a relay driver 18 by line 20, which as will be discussed, controls the operation of the main power relay 22 which in turn controls the availability of power to the protected device.

The microcomputer 10 is coupled to a keypad 24 by line 25, and to a digital display 26 by line 28. In addition, microcomputer 10 is coupled to a read-only memory (ROM) 32 and to a programable read-only memory (PROM) 34. As will be discussed more fully below, the ROM 32 contains a power-on sequence of operations which the microcomputer performs whenever external A.C. power is initially supplied on line 16.

In operation, a device incorporating the present invention is supplied with external power, typically by coupling line 16 to a household A.C. outlet. The logic power supply 12 converts the A.C. current into a D.C. source and provides the requisite D.C. current on line 17. Microcomputer 10, upon the application of power to the power supply 12 executes a power-on routine which is stored in ROM 32. The power-on routine, as will be described, requires the microcomputer to await the input of a code from keypad 24. As the user inputs a code, microcomputer 10 compares the keyed in security code keystroke by keystroke with a predetermined primary security code stored in PROM 34. If the codes match, microcomputer 10 signals the relay driver 18 on line 36 to provide A.C. power to the device by activating the main power relay 22. Power is thereby provided to the device's main power supply 37, or other applicable circuit depending on the nature of the device protected. Additionally, once the proper code is entered microcomputer 10 issues other control and enable signals, as may be required by the particular device which is protected, such as by way of illustration, frequency selection, timer, volume and contrast control signals.

Figure 2:
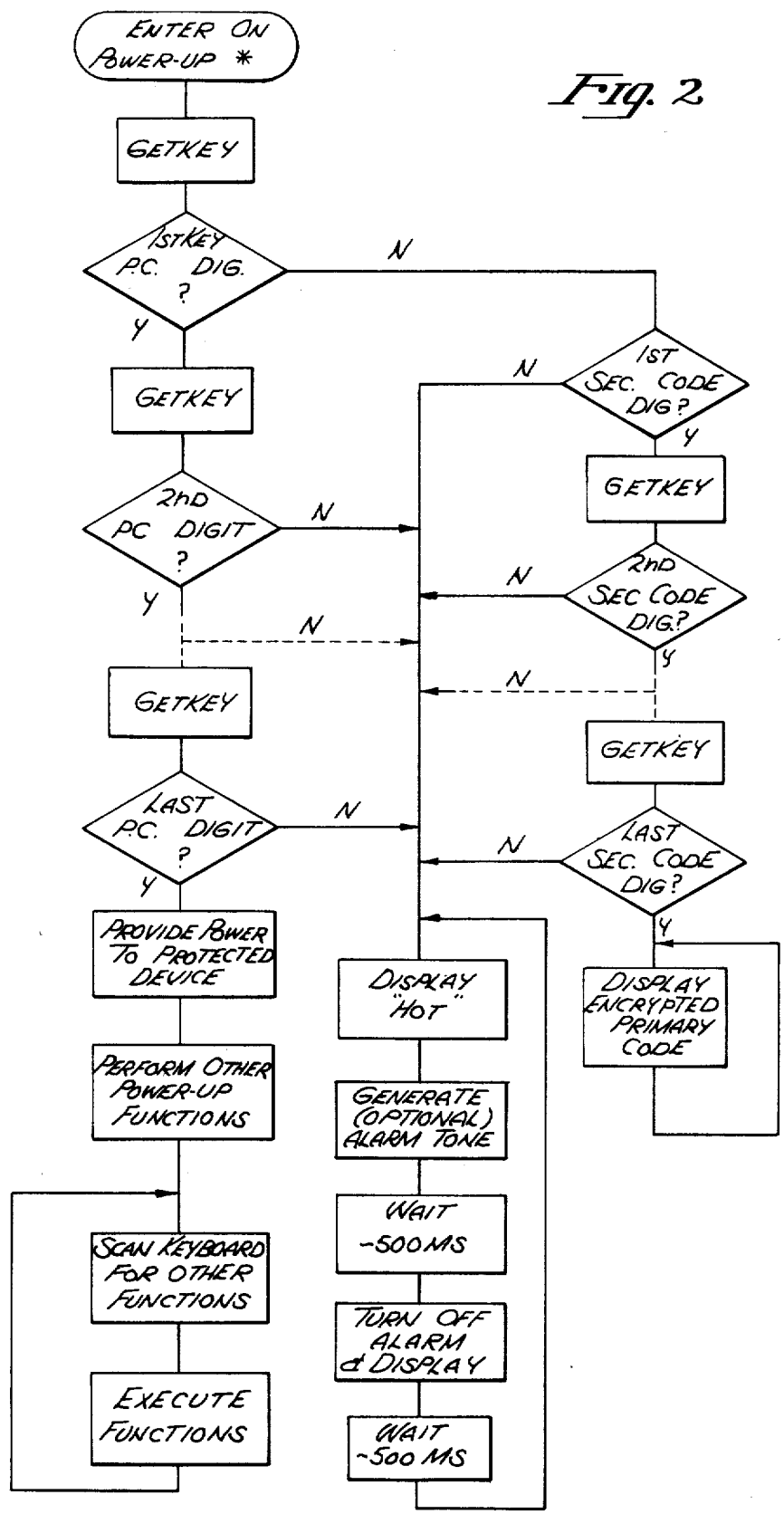
FIG. 2 is a flow diagram showing the sequence of steps that the microcomputer executes when power is first applied to the protected electronic device.

With reference to FIG. 2, the power-on sequence of operations of the microcomputer 10 is described. In the diagrams there shown, diamond shaped boxes with "?" marks represent decision points in the program. If the condition received by the decision is satisfied at the time it is encountered, then the next operation is the one determined by following the line marked by a "Y". If the condition is not satisfied, the next instruction is determined by following the line marked "N". Rectangular symbols represent operations which are carried out by he microcomputer and its associated elements. An oval symbol represents a starting entry into the program sequence by virtue of the initial application of power to the microcomputer from logic power supply 12 once the device to be protected is plugged in. The sequence of operations follows the path defined by the arrows. The program is delineated by following the lines joining the various symbols.

FIG. 2 indicates the sequence of steps executed when power is first applied by plugging the protected device into an A.C. power source. The program begins at the oval marked "Enter on Power-up". The microcomputer initially executes a "getkey" operation in which it scans the keypad 24 and awaits the input of the first digit (or character) of the primary security code. Upon entry of a first digit by the user, microcomputer 10 compares the entered digit with the first digit of the predetermined primary security code stored in PROM 34. As is illustrated in FIG. 2, if a match exists the microcomputer executes another "getkey" operation and compares the second inputed digit or character to the second digit of the stored primary security code. Microcomputer 10 continues this input and compare sequence until all of the digits of the security code are thereby entered and compared.

If the inputted first digit does not match the first digit of the stored primary code, microcomputer 10 compares the first inputted digit with a secondary code also stored in PROM 34. As will be discussed, this secondary code provides additional security to the device since it can only be obtained from the manufacturer or its authorized agents. If the first inputted digit matches the first digit of the secondary code, then subsequent digit entries by the user are compared only with the stored secondary code. Thus, it will be noted that in the presently preferred embodiment the primary and secondary codes may not incorporate identical first digits, in order to avoid ambiguity as to which code microcomputer 10 is to compare. However, if identical first digits are desired, the power-up routine can be easily modified such that other digits or the like are compared to identify which code is being entered. As shown in the flow diagram of FIG. 2, upon the proper entry of all digits of the secondary code, microcomputer 10 displays an encrypted version of the primary security code on digital display 26. It will be appreciated, that the encrypted version of the primary security code may be either stored in a memory location within the PROM 34 or may be generated by an encryption algorithm stored within ROM 32 and executed by the microcomputer.

As shown in FIG. 2, if the first digit or character entered by the user does not match either the primary security code or the secondary code as discussed above, the microcomputer enters an alarm mode and displays "HOT" or some other similar message in the digital display 26 and does not enable the main power relay 22 through the relay driver 18. Thus, until power is removed, by for example removing the A.C. plug, the microcomputer will not permit further keyboard entries and will not enable power to be coupled to the protected device through the main power relay 22. As illustrated in FIG. 2, the alarm mode may include an optional audible alarm tone in the form of a warble generated by the microcomputer as a digital pulse train of varying period, and incorporate a flashing digital display. As depicted, if the first inputted digit matches with either the stored primary or secondary code, any subsequent digit which when compared fails to match will automatically send the microcomputer into the alarm mode.

If all of the digits or characters comprising the primary security code are properly entered, then microcomputer 10 signals relay driver 18 on line 36 to activate the main power relay 22 thereby providing power to the protected device. In addition, microcomputer 10 after a proper code has been fully entered, performs all other functions as may be required by the particular device, for example tuning, channel selection and other similar functions.

Assume for the sake of example that a user plugs a device protected by the present invention into an A.C. outlet. Microcomputer 10 executes the above described power-on routine and awaits the input of the primary security code. After the user has inputted the code, microcomputer 10 enables the protected device by signaling the relay driver 18 to provide power to the device's other systems. Once the proper code has been entered, a subsequent user need not reenter the code in order to operate the device at a later time. Rather, the user may operate the device as if the security system was not installed in the device. For example, in the case of a radio or television, the user would merely switch the device into the "on" position and operate it in a normal manner. However, if the protected device is unplugged, as would be the case where a thief has removed it, or if the power fails, then entry of the primary code would be required prior to subsequent use since once power has returned microcomputer 10 automatically executes the above described power-on routine.

Assume further that the registered owner of the protected device has misplaced or has forgotten the primary security code. The owner contacts the manufacturer of the device or authorized representative, and after supplying proper identification such as, for example, name, address, serial number and/or date and place of purchase, the manufacturer or its representative supplies the owner with the above described secondary security code. The owner plugs the device into an A.C. outlet and enters the secondary code on keypad 24. As previously described, microcomputer 10 compares the entered secondary code with a predetermined code stored in PROM 34. If the secondary code has been properly entered, microcomputer 10 displays on digital display 26 an encrypted version of the primary security code. The owner reports the encrypted code to the manufacturer or its representative, who in turn may enter the encrypted code into a computer which applies a decryption algorithm to recover the actual primary code. The manufacturer may then report or mail the actual primary code to the owner, and perhaps charge a fee for the service. Furthermore, if additional security is required the primary code may be printed, sealed and mailed automatically, by for example a computer, such that the code is not observable by the manufacturer's personnel.

The number of digits and/or characters which the primary and secondary codes are comprised of may vary with any given application of the present invention. For example, in cases where higher security is desired a length of ten digits may be used. However, it is believed that a five digit code will provide the desired level of security without being ungainly for the user. Additionally, it will be noted that the security codes may comprise digits, characters, symbols or any combination thereof (hereinafter referred to as alphanumeric characters) which is appropriate for the specific application of the protected device.

In addition, it will be noted that the secondary code need not be unique to each device, but may be common to the entire production run, model or series. Furthermore, it will be appreciated that the serial number of a particular device may be cross-referenced by the manufacturer to the encrypted version of the primary security code, or that the PROM 34 may contain the serial number which can be accessed only upon entry of the secondary code. Thus, the actual serial number of a device protected by the present invention can more readily be traced by law enforcement agencies, even after a thief has altered or destroyed the serial number located physically on the device itself.

It will be apparent to one skilled in the art that although the presently preferred embodiment, as disclosed, utilizes an A.C. source for external power, the invention can be readily applied to D.C. external sources, such as for example an automotive electrical system. In the case of a D.C. system, the logic power supply 12 would both regulate and provide the appropriate D.C. current and voltage for the microcomputer 10. Similarly, additional obvious modifications to the invention to render it compatible with a D.C. source would be made. Thus, the present invention may be adapted to protect electronic devices used on automobiles, aircraft or watercraft, such as, for example, radio receivers and tape decks.

It will be appreciated that if the protected device requires a microcomputer for operation, the present invention may be realized without relay driver 18 or the main power relay 22. Rather than enabling the device by coupling external power to it, microcomputer 10 may be programmed to withhold all command and control functions necessary to operate the device until a proper security code is entered. As disclosed in the presently preferred embodiment, upon the application of external power to the device microcomputer 10 executes the aforementioned power-on routine. Only upon the entry by a user of a proper code would microcomputer 10 accept and issue the required control signals needed to operate the device. Once the correct code is entered, the user would not be required to reenter the code as long as power to the microcomputer remains uninterrupted. In addition, it will be apparent that although in the presently preferred embodiment the power-on routine and security codes are stored in ROM 32 and PROM 34, respectively, memory means within the microcomputer 10 itself may be used for substantially the same purpose.

The security system of the present invention provides the owner of the device with a level of security heretofore not known in the prior art. A thief who removes a device protected by the present invention will be unable to use the device, and thus once aware that the device is so protected will likely be deterred from removing it. Moreover, unlike devices previously known in the art, the present invention does not require a user to enter the security code each time the device is to be operated. Rather, the security code need only be entered when power is initially applied to the device by plugging it into an A.C. socket, or by coupling it to a D.C. power source such as an automotive electrical system. The use of a secondary code to provide an encrypted version of the primary security code and a decryption algorithm to recover the true primary code, helps prevent abuses by personnel who are employed by the manufacturer in that the primary code may be available only on a need to know basis. In addition, the present invention is relatively inexpensive, and may be realized with little modification to devices already incorporating a microcomputer control system, such as for example a frequency-synthesized tuning circuit.

Thus, a security system for electronic devices has been described which is both highly secure and convenient for the user.

I claim:

1. A security system including a microcomputer for protecting an externally powered device such that once said device has been enabled it will remain capable of being operated unless the security system is disconnected from the external power source, comprising:
   a microcomputer connected to said external power source;
   storage means for storing a predetermined code;
   input means for receiving a code;
   comparator means coupled to said storage means and said input means for comparing said first predetermined code with said received code and for producing a first output signal upon determining that said first predetermined and received codes are identical; and
   relay means coupled between said external power source and the protected device and connected to be actuated by said first output signal such that external power is provided to enable the protected device by selectively coupling said external power source to said device upon receipt of said first output signal;
   whereby said received code need only be reentered if the coupling of said microcomputer to said external power source is interrupted.

2. A security system including a microcomputer for protecting an externally powered device such that once said device has been enabled it will remain capable of being operated unless the security system is disconnected from the external power source, comprising:
   a microcomputer connected to said external power source;
   storage means for storing first and second predetermined codes;
   input means for receiving a code;
   comparator means coupled to said storage means and said input means for comparing said first predetermined code with said received code and for producing a first output signal upon determining that said first predetermined and received codes are identical; and
   relay means coupled between said external power source and the protected device and connected to be actuated by said first output signal such that external power is provided to the protected device by coupling said external power source to said device upon receipt of said first output signal;
   whereby said received code need only be reentered if the coupling of said microcomputer to said external power source is interrupted.

3. The security system as defined by claim 2 wherein said comparator means compares a first alphanumeric character of said received code with a first alphanumeric character of said first predetermined code and in the absence of a match compares said first received alphanumeric character with a first alphanumeric character of said second predetermined code.

4. The security system as defined by claim 3 further including display means coupled to said comparator means for displaying alphanumeric characters.

5. The security system as defined by claim 4 wherein an encrypted version of said first predetermined code is displayed if said received code matches said second predetermined code.

6. The security system as defined by claim 5 wherein said comparator means comprises microcomputer means capable of executing stored sequences of binary quantities.

7. The security system as defined by claim 6 wherein:
   said storage means includes an alarm routine stored as a predetermined sequence of binary quantities;
   said microcomputer means executes said alarm routine in the absence of a match between said received code and said first and second predetermined codes stored within said storage means.

8. The security system as defined by claim 7 wherein said input means comprises a keypad.

9. A security system including a microcomputer for protecting an electrically-powered device such that once said device has been enabled it will remain capable of being operated unless the security device is disconnected from an external power source, comprising:
   a microcomputer connected to said external power source;
   storage means connected to said microcomputer for storing first and second predetermined codes;
   input means connected to said micorcomputer for receiving a code;
   comparator means coupled to said storage means and said input means for comparing said first predetermined code with said received code and for producing a first output signal upon determining that said first predetermined and received codes are identical;
   coupling means connected to receive said first output signal for enabling said protected device upon receipt of said first output signal; and
   whereby said received code need only a reentered if the connection of said microcomputer to said external power source is interrupted.

10. The security system as defined by claim 9, further including display means coupled to said comparator means for displaying alphanumeric characters.

11. The security system as defined by claim 10, wherein an encrypted version of said first predetermined code is displayed if said received code matches said second predetermined code.

12. The security system as defined by claim 11, wherein said comparator means compares a first alphanumeric character of said received code with a first alphanumeric character of said first predetermined code and in the absence of a match compares said first received alphanumeric character with a first alphanumeric character of said second predetermined code.

13. The security system as defined by claim 12, wherein said comparator means comprises microcomputer means capable of executing stored sequences of binary quantities.

14. The security system as defined by claim 13 wherein:

said storage means includes an alarm routine stored as a predetermined sequence of binary quantities;

said microcomputer means executes said alarm routine in the absence of a match between said received code and said first and second predetermined codes stored within said storage means.

15. The security system as defined by claim 14, wherein said relay means comprises an electrical relay driven by a relay driver coupled to said microcomputer means.

16. The security system as defined by claim 15, wherein said input means comprises a keypad.

* * * * *

UNITED STATES PATENT AND TRADEMARK OFFICE
CERTIFICATE OF CORRECTION

PATENT NO. : 4,604,708

DATED : August 5, 1986

INVENTOR(S) : Lewis

It is certified that error appears in the above-identified patent and that said Letters Patent is hereby corrected as shown below:

| COLUMN | LINE | DESCRIPTION |
|--------|------|-------------|
| 8 | 46 | Between the words "only" and "reentered" delete "a" and insert --be--. |

Signed and Sealed this

Twenty-first Day of April, 1987

Attest:

DONALD J. QUIGG

*Attesting Officer*    *Commissioner of Patents and Trademarks*

REEXAMINATION CERTIFICATE (3351st)
United States Patent [19]
Lewis

[11] B1 4,604,708
[45] Certificate Issued Oct. 14, 1997

[54] ELECTRONIC SECURITY SYSTEM FOR EXTERNALLY POWERED DEVICES

[76] Inventor: Gainer R. Lewis, 7018 Pacific View Dr., Hollywood, Calif. 90068

Reexamination Request:
No. 90/004,150, Feb. 23, 1996

Reexamination Certificate for:
Patent No.: 4,604,708
Issued: Aug. 5, 1986
Appl. No.: 669,727
Filed: Nov. 8, 1984

Related U.S. Application Data

[63] Continuation of Ser. No. 328,080, Dec. 7, 1981, abandoned.

[51] Int. Cl.⁶ .............................. G06F 13/00; G06F 7/04
[52] U.S. Cl. .............................. 395/188.01; 340/825.31
[58] Field of Search .............................. 395/186, 187.01, 395/188.01; 364/918.7; 307/10.7, 10.6, 10.5, 10.4, 10.3, 10.2; 380/3, 4, 23; 455/346, 345, 347

[56] References Cited

U.S. PATENT DOCUMENTS

| | | | |
|---|---|---|---|
| 3,796,889 | 3/1974 | Fradkin et al. | 317/134 |
| 3,987,408 | 10/1976 | Sassover et al. | 340/53 |
| 4,002,956 | 1/1977 | Minor et al. | 340/280 |
| 4,103,289 | 7/1978 | Kolber | 340/164 |
| 4,179,733 | 12/1979 | Launzel et al. | 364/200 |
| 4,267,578 | 5/1981 | Vetter . | |
| 4,288,659 | 9/1981 | Atalla | 178/22.08 |
| 4,288,778 | 9/1981 | Zucker | 340/64 |
| 4,308,536 | 12/1981 | Sims, Jr. et al. | 343/7 |
| 4,310,720 | 1/1982 | Check, Jr. | 178/22.08 |
| 4,333,074 | 6/1982 | Sutherland et al. | 340/825.3 |
| 4,449,385 | 5/1984 | Thirion et al. | 70/277 |

FOREIGN PATENT DOCUMENTS

49-29527 3/1974 Japan .
56-42436 4/1981 Japan .

OTHER PUBLICATIONS

Reference Data for Radio Engineers, Sams and Co., ITT, pp. 40–19.
Webster's New World Dictionary of Computer Terms, Prentice Hall, pp. 234–235 1965.
MCS–4 Microcomputer Set Users Manual, Rev. 5, Intel Corp., p. 4 1974.
MCS–80 User Manual, Intel Corp., pp. II 1977.
Introduction to Microprocessors: Software, Hardware, Programming, L. Leventhal, Printice Hall, pp. 19, 435 1978.
The art of electronics, Horowitz and Hill, Cambridge University Press, pp. 453 and 484 1980.

Primary Examiner—Robert W. Beausoliel, Jr.

[57] ABSTRACT

An electronic security system for a device requiring an external power source is disclosed. The security system includes a microcomputer which executes a power-on routine stored in memory whenever the microcomputer is initially coupled to a power source. The user must enter a primary security code which is compared to a predetermined code, and if the codes match, the microcomputer signals a relay to provide power to the device, thereby enabling it. Once enabled, the user need not reenter the security code as long as the external source of power to the device remains uninterrupted. A secondary security code may be entered if the primary code has been forgotten or misplaced. Upon entry of the secondary code, the microcomputer displays an encrypted version of the primary security code. If an incorrect code is entered by the user, the microprocessor executes an alarm routine which may include visual and audible warnings.

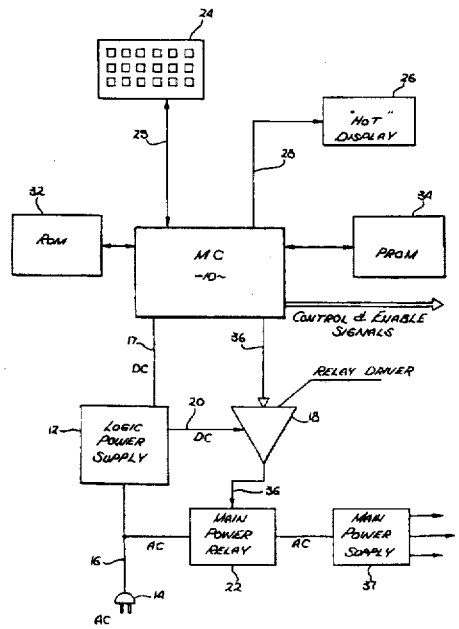

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 2, 9, 15 are determined to be patentable as amended.

Claims 3-8, 10-14, 16, dependent on an amended claim, are determined to be patentable.

New claims 17-126 are added and determined to be patentable.

1. A security system [including a microcomputer] for protecting an externally powered *protected* device *corresponding to all or a portion of an electronic system* such that once said device has been enabled it will remain capable of being operated unless the security system is disconnected from the external power source, comprising:

a microcomputer connected to said external power source *and receiving power from said external power source unless said security system is disconnected from said external power source;* storage means for storing a *first* predetermined code;

input means for receiving a code;

comparator means *included in said microcomputer, said comparator means being* coupled to said storage means and said input means [,] for comparing said first predetermined code with said received code and for producing a first output signal upon determining that said first predetermined and received codes are identical; and relay means coupled between said external power source and the protected device and connected to be actuated by said first output signal such that external power is provided to enable the protected device by selectively coupled said external power source to said device upon receipt of said first output signal, *said relay means being coupled to said external power source downstream from the coupling of said microcomputer to said external power source so that said microcomputer remains connected to said external power source independently of whether said relay means is coupling said external power source to said protected device;* whereby said received code need only be reentered if the coupling of said microcomputer to said external power source is interrupted.

2. A security system [including a microcomputer] for protecting an externally powered *protected* device *corresponding to all or a portion of an electronic system* such that once said device has been enabled it will remain capable of being operated unless the security system is disconnected from the external power source, comprising:

a microcomputer connected to said external power source *and receiving power from said external power source unless said security system is disconnected from said external power source;* storage means for storing first and second predetermined codes;

input means for receiving a code;

comparator means *included in said microcomputer, said comparator means being* coupled to said storage means and said input means [,] for comparing said first predetermined code with said received code and for producing a first output signal upon determining that said first predetermined and received codes are identical; and relay means coupled between said external power source and the protected device and connected to be actuated by said first output signal such that external power is provided to the protected device by coupled said external power source to said device upon receipt of said first output signal *said relay means being coupled to said external power source downstream from the coupling of said microcomputer to said external power source so that said microcomputer remains connected to said external power source independently of whether said relay means is coupling said external power source to said protected device;* whereby said received code need only be reentered if the coupling of said microcomputer to said external power source is interrupted.

9. A security system [including a microcomputer] for protecting an electrically-powered *protected* device *corresponding to all or a portion of an electronic system* such that once said *protected* device has been enabled it will remain capable of being operated unless the security [device] *system* is disconnected from an external power source, comprising:

a microcomputer connected to said external power source *and receiving power from said external power source unless said security system is disconnected from the external power source;* storage means connected to said microcomputer for storing first and second predetermined codes;

input means connected to said [micorcomputer] *microcomputer* for receiving a code;

comparator means *included in the microcomputer, said comparator means being* coupled to said storage means and said input means [,] for comparing said first predetermined code with said received code and for producing a first output signal upon determining that said first predetermined and received codes are identical;

coupling means connected to receive said first output signal for enabling said protected device upon receipt of said first output signal; and whereby said received code need only [a] *be* reentered if the connection of said microcomputer to said external power source is interrupted.

15. The security system as defined by claim 14, wherein said [relay] *coupling* means comprises an electrical relay driven by a relay driver coupled to said microcomputer means.

*17. The security system as defined by claim 1 wherein said comparator means compares said first predetermined code with said received code responsive to said external power source being applied to said microcomputer.*

*18. The security system as defined by claim 1 wherein said protected device comprises the main power supply of said electronic system.*

*19. The security system as defined by claim 1 wherein said protected device comprises an applicable circuit component of said electronic system.*

20. The security system as defined by claim 1 wherein said comparator means compares each of a plurality of entries of said received code with a corresponding portion of said first predetermined code as each of said entries are entered through said input means.

21. The security system as defined by claim 1 wherein said storage means comprises a semiconductor programmable read only memory integrated circuit.

22. The security system as defined by claim 1 wherein said electronic system includes a main power switch, and wherein said microcomputer is coupled to said external power source upstream from the coupling of said main power switch to said external power source so that said microcomputer remains connected to said external power source independently of whether said main power switch is on or off.

23. The security system as defined by claim 1 wherein said microcomputer executes a power-up routine responsive to said external power source being initially applied to said microcomputer, and wherein said power-up routine causes said comparator means to compare said first predetermined code with said received code.

24. The security system as defined by claim 1 wherein said external power source comprises an AC power source.

25. The security system as defined by claim 1 wherein said comparator means produces said first output signal immediately upon determining that said first predetermined and received codes are identical.

26. The security system as defined by claim 1 wherein said input means comprises a keypad.

27. The security system as defined by claim 1 wherein said microcomputer further controls the operation of at least a portion of said electronic system other than said security system.

28. The security system as defined by claim 1 wherein said relay means comprise a relay coupled to said comparator means, said relay coupling said external power source to said protected device responsive to receiving said first output signal from said comparator means.

29. The security system as defined by claim 1 wherein said relay means comprise:
   a relay driver coupled to said comparator means, said relay driver receiving said first output signal and generating a relay drive signal responsive thereto, and
   a relay coupled to said relay driver, said relay coupling said external power source to said protected device responsive to receiving said relay drive signal from said relay driver.

30. The security system as defined by claim 1 wherein said comparator means continuously produces said first output signal upon determining that said first predetermined and received codes are identical until said external power is removed from said microcomputer.

31. A security system for protecting an externally powered protected device corresponding to all or a portion of an electronic system such that once said device has been enabled it will remain capable of being operated unless the security system is disconnected from the external power source, said security system comprising:
   relay means coupled between said external power source and the protected device and connected to be actuated by a first output signal such that external power is provided to enable the protected device by selectively coupling said external power source to said device upon receipt of said first output signal;
   a microcomputer connected to said external power source independently of whether or not said protected device is coupled to said external power source;
   storage means for storing a predetermined code;
   input means for receiving a code; and
   comparator means included in the microcomputer, said comparator means being coupled to said storage means and said input means for comparing said predetermined code with said received code and for producing said first output signal upon determining that said predetermined and received codes are identical;
   whereby said received code need only be reentered if the coupling of said microcomputer to said external power source is interrupted.

32. The security system as defined by claim 31 wherein said comparator means compares said predetermined code with said received code responsive to said external power source being applied to said microcomputer.

33. The security system as defined by claim 31 wherein said protected device comprises the main power supply of said electronic system.

34. The security system as defind by claim 31 wherein said protected device comprises an applicable circuit component of said electronic system.

35. The security system as defind by claim 31 wherein said comparator means compares each of a plurality of entries of said received code with a corresponding portion of said stored predetermined code as each of said entries are entered through said input means.

36. The security system as defined by claim 31 wherein said storage means comprises a semiconductor programmable read only memory integrated circuit.

37. The security system as defined by claim 31 wherein said electronic system includes a main power switch, and wherein said microcomputer is coupled to said external power source upstream from the coupling of said main power switch to said external power souce so that said microcomputer remains connected to said external power source independently of whether said main power switch is on or off.

38. The security system as defined by claim 31 wherein said microcomputer executes a power-up routine responsive to said external power source being initially applied to said microcomputer, and wherein said power-up routine causes said comparator means to compare said stored predetermined code with said received code.

39. The security system as defined by claim 31 wherein said external power source comprises an AC power source.

40. The security system as defined by claim 31 wherein said comparator means produces said first output signal immediately upon determining that said predetermined and received codes are identical.

41. The security system as defined by claim 31 wherein said input means comprises a keypad.

42. The security system as defined by claim 31 wherein said microcomputer further controls the operation of at least a portion of said electronic system other than said security system.

43. The security system as defined by claim 31 wherein said relay means comprises a relay coupled to said comparator means, said relay coupling said external power source to said protected device responsive to receiving said first output signal from said comparator means.

44. The security system as defined by claim 31 wherein said relay means comprise:
   a relay driver coupled to said comparator means, said relay driver receiving said first output signal and generating a relay drive signal responsive thereto; and
   a relay coupled to said relay driver, said relay coupling said external power source to said protected device responsive to receiving said relay drive signal from said relay driver.

45. The security system as defined by claim 31 wherein said comparator means continuously produces said first output signal upon determining that said predetermined and received codes are identical until said external power is removed from said microcomputer.

46. A security system for protecting an externally powered protected device corresponding to all or a portion of an electronic system such that once said device has been enabled it will remain capable of being operated unless the security system is disconnected from the external power source, said security system comprising:

relay means coupled between said external power source and the protected device and connected to be actuated by a first output signal such that external power is provided to enable the protected device by selectively coupling said external power source to said device upon receipt of said first output signal;

a microcomputer connected to said external power source upstream from the coupling of said relay means to said external power source so that said microcomputer remains connected to said external power source independently of whether said relay means is coupled said external power source to said protected device;

storage means for storing a predetermined code;

input means for receiving code; and comparator means included in the microcomputer, said comparator means being coupled to said storage means and said input means for comparing said predetermined code with said received code and for producing said first output signal upon determining that said predetermined and received codes are identical;

whereby said received code need only be reentered if the coupling of said microcomputer to said external power source is interrupted.

47. The security system as defined by claim 46 wherein said comparator means compares said predetermined code with said received code responsive to said external power source being applied to said microcomputer.

48. The security system as defined by claim 40 wherein said protected device comprises the main power supply of said electronic system.

49. The security system as defined by claim 46 wherein said protected device comprises an applicable circuit component of said electronic system.

50. The security system as defined by claim 40 wherein said comparator means compares each of a plurality of entries of said received code with a corresponding portion of said stored predetermined codes as each of said entries are entered through said input means.

51. The security system as defined by claim 46 wherein said storage means comprises a semiconductor programmable read only memory integrated circuit.

52. The security system as defined by claim 46 wherein said electronic system includes a main power switch, and wherein said microcomputer is coupled to said external power source upstream from the coupling of said main power switch to said external power source so that said microcomputer remains connected to said external power source independently of whether said main power switch is on or off.

53. The security means as defined by claim 46 wherein said microcomputer executes a power-up routine responsive to said external power source being initially applied to said microcomputer, and wherein said power-up routine causes said comparator means to compare said predetermined code with said received code.

54. The security system as defined by claim 46 wherein said external power source comprises an AC power source.

55. The security system as defined by claim 46 wherein said comparator means produces said first output signal immediately upon determining that said predetermined and received codes are identical.

56. The security system as defined by claim 46 wherein said input means comprises a keypad.

57. The security system as defined by claim 46 wherein said microcomputer further controls the operation of at least a portion of said electronic system other than said security system.

58. The security system as defined by claim 46 wherein said relay means comprises a relay coupled to said comparator means, said relay coupled said external power source to said protected device responsive to receiving said first output signal from said comparator means.

59. The security system as defined by claim 46 wherein said relay means comprises;

a relay driver coupled to said comparator means, said relay driver receiving said first output signal and generating a relay drive signal responsive thereto; and a relay coupled to said relay driver, said relay coupling said external power source to said protected device responsive to receiving said relay drive signal from said relay driver.

60. The security system as define by claim 46 wherein said comparator means continuously produces said first output signal upon determining that said predetermined and received codes are identical until said external power is removed from said microcomputer.

61. The security system as defined by claim 9 wherein said comparator means compares said first predetermined code with said received code responsive to said external power source being applied to said microcomputer.

62. The security system as defined by claim 9 wherein said coupling means enables said protected device by selectively coupling power to said protected device upon receipt of said first output signal.

63. The security system as defined by claim 9 wherein said protected device comprises an applicable circuit component of said electronic system.

64. The security system as defined by claim 9 wherein said comparator means compares each of a plurality of entries of said received code with a corresponding portion of said first predetermined code as each of said entries are entered through said input means.

65. The security system as defined by claim 9 wherein said storage means comprises a semiconductor programmable read only memory integrated circuit.

66. The security system as defined by claim 9 wherein said second predetermined code compries a plurality of characters.

67. The security system as defined by claim 9 wherein said microcomputer executes a power-up routine responsive to said external power source being initially applied to said microcomputer, and wherein said power-up routine causes said comparator means to compare said first predetermined code with said received code.

68. The security system as defined by claim 9 wherein said external power source comprises an AC power source.

69. The security system as defined by claim 9 wherein said comparator means produces said first output signal immediately upon determining that said first predetermined and received codes are identical.

70. The security system as defined by claim 9 wherein said input means comprises a keypad.

71. The security system as defined by claim 9 wherein said microcomputer further controls the operation of at least a portion of said electronic system other than said security system.

72. The security system as defined by claim 9 wherein said comparator means continuously produces said first output signal upon determining that said first predetermined and received codes are identical until said external power is removed from said microcomputer.

73. The security system as defined by claim 9 wherein said comparator means selectively produces said first output signal responsive to user actions upon determining that said first predetermined and received codes are identical until said external power is removed from said microcomputer.

74. The security system as defined by claim 9 wherein said second predetermined code is used for a security related function.

75. The security system as defined by claim 9 wherein said first and second predetemined codes are different from each other.

76. The security system as defined by claim 9 wherein said microcomputer is programmed to use said first and second predetermined codes for different functions.

77. The security system as defined by claim 76 wherein said first and second predetermined codes are used for different security related functions.

78. The security system as defined by claim 77 wherein said microcomputer causes an encrypted version of said first predetermined code to be displayed responsive to said received code matching said second predetermined code.

79. The security system as defined by claim 9 wherein said first output signal comprises a control signal selectively produced by said microcomputer to control the operation of said protected device upon determining that said first predetermined and received codes are identical, and wherein said coupling means comprises a signal path coupling said control signal from said microcomputer to said protected device.

80. The security system as defined by claim 9 wherein said electronic system includes a main power switch, and wherein said microcomputer is coupled to said external power source upstream from the coupling of said main power switch to said external power source so that said microcomputer remains connected to said external power source independently of whether said main power switch is on or off.

81. A security system for protecting an electrically-powered protected device corresponding to all or a portion of an electronic system such that once said device has been enabled it will remain capable of being operated unless the security system is disconnected from an external power source, said security system comprising:

a microcomputer connected to said external power source and receiving power from said external power source unless said electronic system is disconnected from said external power source;

storage means connected to said microcomputer for storing first and second predetermined codes;

input means connected to said microcomputer for receiving a code;

comparator means included in the microcomputer, said comparator means being coupled to said storage means and said input means for causing said microcomputer to execute a power-up routine comparing said first predetermined code with said received code and for producing a first output signal upon determining that said first predetermined and received codes are identical, said microcomputer being inhibited from normal operation unless said first predetermined and received codes are identical; and coupling means connected to receive said first output signal for enabling said protected device upon receipt of said first output signal;

whereby said received code need only be reentered if the connection of said microcomputer to said external power source is interrupted.

82. The security system as defined by claim 81 wherein said comparator means compares said first predetermined code with said received code responsive to said external power source being applied to said microcomputer.

83. The security system as defined by claim 81 wherein said coupling means enables said protected device by selectively coupling power to said protected device upon receipt of said first output signal.

84. The security system as defined by claim 81 wherein said protected device comprises an applicable circuit component of said electronic system.

85. The security system as defined by claim 81 wherein said comparator means compares each of a plurality of entries of said received code with a corresponding portion of said first predetermined code as each of said entries are entered through said input means.

86. The security system as defined by claim 81 wherein said storage means comprises a semiconductor programmable read only memory integrated circuit.

87. The security system as defined by claim 81 wherein said second predetermined code comprises a plurality of characters.

88. The security system as defined by claim 81 wherein said external power source comprises an AC power source.

89. The security system as defined by claim 81 wherein said comparator means produces said first output signal immediately upon determining that said first predetermined and received codes are identical.

90. The security system as defined by claim 81 wherein said input means comprises a keypad.

91. The security system as defined by claim 81 wherein said microcomputer further controls the operation of at least a portion of said electronic system other than said security system.

92. The security system as defined by claim 81 wherein said comparator means continuously produces said first output signal upon determining that said first predetermined and received codes are identical until said external power is removed from said microcomputer.

93. The security system as defined by claim 81 wherein said comparator means selectively produces said first output signal responsive to user actions upon determining that said first predetermined and received codes are identical until said external power is removed from said microcomputer.

94. The security system as defined by claim 81 wherein said second predetermined code is used for a security related function.

95. The security system as defined by claim 81 wherein said first and second predetermined codes are different from each other.

96. The security system as defined by claim 81 wherein said microcomputer is programmed to use said first and second predetermined codes for different functions.

97. The security system as defined by claim 96 wherein said first and second predetermined codes are used for different security related functions.

98. The security system as defined by claim 7 wherein said microcomputer causes an encrypted version of said first predetermined code to be displayed responsive to said received code matching said second predetermined code.

99. The security system as defined by claim 81 wherein said first output signal comprises a control signal selectively produced by said microcomputer to control the operation of said protected device upon determining that said first predetermined and received codes are identical, and wherein said coupling means comprises a signal path coupling said control signal from said microcomputer to said protected device.

100. The security system as defined by claim 81 wherein said comparator means compares a first alphanumeric character of said received code with a first alphanumeric character of said first predetermined code and in the absence of a match compares said first received alphanumeric character with a first alphanumeric character of said second predetermined code.

101. The security system as defined by claim 81, further including display means coupled to said comparator means for displaying alphnumeric characters.

102. The security system as defined by claim 81 wherein an encrypted version of said first predetermined code is displayed if said received code matches said second predetermined code.

103. The security system as defined by claim 81 wherein; said storage means includes an alarm routine stored as a predetermined sequence of binary quantities; and
said microcomputer means executes said alarm routine in the absence of a match between said received code and said first and second predetermined codes stored within said storage means.

104. The security system as defined by claim 81 wherein said electronic system includes a main power switch, and wherein said microcomputer is coupled to said external power source upstream from the coupling of said main power switch to said external power source so that said microcomputer remains connected to said external power source independently of whether said main power switch is on or off.

105. A security system for protecting an electrically-powered protected device corresponding to all or a portion of an electronic system such that once said device has been enabled it will remain capable of being operated unless the security system is disconnected from an external power source, comprising:
a microcomputer connected to said external power source and receiving power from said external power source unless said electronic system is disconnected from the external power source;
storage means connected to said microcomputer for storing first and second predetermined codes;
input means connected to said microcomputer for receiving a code;
comparator means included in the microcomputer, said comparator means being coupled to said storage means and said input means for comparing said first predetermined code with said received code and for producing a first output signal upon determining that said first predetermined and received codes are identical, said first output signal being a control signal selectively produced by said microcomputer to control the operation of said protected device; and
coupling means connected to receive said first output signal for enabling said protected device upon receipt of said first output signal, said coupling means including a signal path coupling said control signal from said microcomputer to said protected device;
whereby said received code need only be reentered if the connection of said microcomputer to said external power source is interrupted.

106. The security system as defined by claim 105 wherein said comparator means compares said first predetermined code with said received code responsive to said external power being applied to said microcomputer.

107. The security system as defined by claim 105 wherein said protected device comprises an applicable circuit component of said electronic system.

108. The security system as defined by claim 105 wherein said comparator means compares each of a plurality of entries of said received code with a corresponding portion of said first predetermined code as each of said entries are entered through said input means.

109. The security system as defined by claim 105 wherein said storage means comprises a semiconductor programmable read only memory integrated circuit.

110. The security system as defined by claim 105 wherein said second predetermined code comprises a plurality of characters.

111. The security system as defined by claim 105 wherein said external power source comprises an AC power source.

112. The security system as defined by claim 105 wherein said comparator means produces said first output signal immediately upon determining that said first predetermined and received codes are identical.

113. The security system as defined by claim 105 wherein said input means comprises a keypad.

114. The security system as defined by claim 105 wherein said microcomputer further controls the operation of at least a portion of said electronic system other than said security system.

115. The security system as defined by claim 105 wherein said comparator means continuously produces said first output signal upon determining that said first predetermined and received codes are identical until said external power is removed from said microcomputer.

116. The security system as defined by claim 105 wherein said comparator means selectively produces said first output signal responsive to user actions upon determining that said first predetermined and received codes are identical until said external power is removed from said microcomputer.

117. The security system as defined by claim 105 wherein said second predetermined code is used for a security related function.

118. The security system as defined by claim 105 wherein said first and second predetermined codes are different from each other.

119. The security system as defined by claim 105 wherein said microcomputer is programmed to use said first and second predetermined codes for different functions.

120. The security system as defined by claim 119 wherein said first and second predetermined codes are used for different security related functions.

121. The security system as defined by claim 120 wherein said microcomputer causes an encrypted version of said first predetermined code to be displayed responsive to said received codes matching said second predetermined code.

122. The security system as defined by claim 105 wherein said comparator means compares a first alphanumeric character of said received code with a first alphanumeric character of said first predetermined code and in the absence of a match compares said first received alphanumeric character with a first alphanumeric character of said second predetermined code.

123. The security system as defined by claim 105, further including display means coupled to said comparator means for displaying alphanumeric characters.

124. The security system as defined by claim 105 wherein an encrypted version of said first predetermined code is displayed if said received code matches said second predetermined code.

125. The security system as defined by claim 105 wherein:
said storage means includes an alarm routine stored as a predetermined sequences of binary quantities; and
said microcomputer means executes said alarm routine in the absence of a match between said received code and said first and second predetermined codes stored within said storage means.

126. The security system as defined by claim 105 wherein said electronic system includes a main power switch, and wherein said microcomputer is coupled to said external power source upstream from the coupling of said main power switch to said external power source so that said microcomputer remains connected to said external power source independently of whether said main power is on or off.

* * * * *